(12) United States Patent
Coulier et al.

(10) Patent No.: US 10,345,606 B2
(45) Date of Patent: Jul. 9, 2019

(54) DISPLAY SYSTEM WITH STATIC GREEN PRIMARY COLOR REDUCTION FILTER

(71) Applicant: BARCO VISUAL (BEIJING) ELECTRONICS CO., LTD., Beijing (CN)

(72) Inventors: Nico Gerard Coulier, Machelen (BE); Xiao Yun Wang, Beijing (CN); Allel Chedad, Zwevegem (BE)

(73) Assignee: BARCO VISUAL (BEIJING) ELECTRONICS COMPANY LIMITED, Beijing (CN)

( * ) Notice: Subject to any disclaimer, the term of this patent is extended or adjusted under 35 U.S.C. 154(b) by 0 days.

(21) Appl. No.: 16/075,293

(22) PCT Filed: Feb. 4, 2016

(86) PCT No.: PCT/CN2016/073505
§ 371 (c)(1),
(2) Date: Aug. 3, 2018

(87) PCT Pub. No.: WO2017/132944
PCT Pub. Date: Aug. 10, 2017

(65) Prior Publication Data
US 2019/0025601 A1    Jan. 24, 2019

(51) Int. Cl.
*G03B 21/14*    (2006.01)
*H04N 9/31*    (2006.01)
(Continued)

(52) U.S. Cl.
CPC .............. *G02B 27/149* (2013.01); *G02B 5/20* (2013.01); *G03B 21/204* (2013.01); *H04N 9/00* (2013.01);
(Continued)

(58) Field of Classification Search
CPC ...... H04N 9/31; H04N 9/3158; H04N 9/3105; H04N 21/21; H04N 21/204; H04N 21/005
See application file for complete search history.

(56) References Cited

U.S. PATENT DOCUMENTS

| 5,986,815 A | 11/1999 | Bryars |
| 9,024,241 B2 | 5/2015 | Wang et al. |

(Continued)

FOREIGN PATENT DOCUMENTS

| CN | 1576986 A | 2/2005 |
| CN | 1885095 A | 12/2006 |

(Continued)

OTHER PUBLICATIONS

International Search Report and Written Opinion in PCT/CN2016/073505, dated Oct. 28, 2016.
(Continued)

*Primary Examiner* — William C. Dowling
(74) *Attorney, Agent, or Firm* — Bacon & Thomas, PLLC (57) ABSTRACT

A projection system for generating an image with three primary colors, including a first and second blue laser beam, a wavelength conversion element for converting the second blue beam into a converted beam having a waveband including at least the second and third wavebands, a beam combiner for combining the first beam and the converted beam, which combination results in a white beam, a notch filter placed in the optical path of the white beam to form a modified white beam including at least the first, second and third wavebands provided to an imaging module, where a static waveband reduction filter is further provided for changing the wavelength of transmitted second waveband of the white beam, such as to adjust a projector white point shift.

20 Claims, 6 Drawing Sheets

(51) Int. Cl.
  *G02B 27/14* (2006.01)
  *G03B 21/20* (2006.01)
  *G02B 5/20* (2006.01)
  *H04N 9/00* (2006.01)

(52) U.S. Cl.
  CPC ......... *H04N 9/3111* (2013.01); *H04N 9/3155* (2013.01); *H04N 9/3158* (2013.01); *H04N 9/3161* (2013.01)

(56) References Cited

U.S. PATENT DOCUMENTS

| | | | |
|---|---|---|---|
| 9,274,407 B2 | 3/2016 | Wang et al. | |
| 2008/0191234 A1 | 8/2008 | Kang et al. | |
| 2011/0292349 A1 | 12/2011 | Kitano | |
| 2011/0304659 A1 | 12/2011 | Lee et al. | |
| 2012/0069269 A1* | 3/2012 | Yang | H04N 9/3114 349/62 |
| 2013/0083295 A1 | 4/2013 | Miyazaki | |
| 2013/0100644 A1 | 4/2013 | Hu et al. | |
| 2013/0194551 A1 | 8/2013 | Zhang et al. | |
| 2013/0215397 A1 | 8/2013 | Matsubara | |
| 2015/0341605 A1 | 11/2015 | Yamada | |
| 2016/0116122 A1 | 4/2016 | Chang et al. | |
| 2019/0037185 A1* | 1/2019 | Tarpan | H04N 9/3182 |

FOREIGN PATENT DOCUMENTS

| | | |
|---|---|---|
| CN | 102936497 A | 2/2013 |
| CN | 103018864 | 4/2013 |
| CN | 103974046 A | 8/2014 |
| CN | 204289503 U | 4/2015 |
| EP | 2712194 | 3/2014 |
| JP | 2016-6523 | 1/2016 |
| TW | 1448806 B | 8/2014 |
| WO | 03/058587 A2 | 7/2003 |

OTHER PUBLICATIONS

International Preliminary Report on Patentability in PCT/CN2016/073505, dated May 14, 2018.
Extended search report for BE 2016/05067 dated Oct. 11, 2016.
Extended search report for BE 2016/05090 dated Oct. 12, 2016.
Extended Search report for BE 2016/05089 dated Oct. 12, 2016.
International Search Report for PCT/EP2017/051701 dated May 12, 2017.
Written Opinion for PCT/EP2017/051701 dated May 12, 2017.
The GNY AG3557 from Intematix portfolio http://www.intematix.com/uploads/Phosphor%20Family%20Sheets/NYAGSingleSheet.pdf (2014).
Jorg Meyer, Frank Tappe, Nico Schmidt, "Future of Lighting," http://www.chemistryviews.org/details/ezine/7897011/The Future of Lighting.html, DOI: 10.1002/chemv.201500033, Copyright: Wiley-VCR Verlag GmbH & Co. KGaA, Weinheim (May 5, 2015).

* cited by examiner

DISPLAY SYSTEM WITH STATIC GREEN PRIMARY COLOR REDUCTION FILTER

The present invention relates to improvements in projector systems, and to the provision of an optical assembly, a light projection system and a method of operating the system.

BACKGROUND OF THE INVENTION

Digital Cinema projectors have to project images according to the DCI (Digital Cinema Initiatives) standard. In this standard, the color gamut of the native (colors on screen without any electronic color correction) and the electronically color corrected gamut projected by a projection device is described.

Colors can be defined with respect to standards, as the standards defined by DCI. In DCI standards, colors are defined with respect to CIE 1931 color spaces, quantitatively relating the colors as defined by their wavelengths to the physiological perception of colors in human vision. The CIE 1931 color space is shown in FIG. 1.

Figure 1:
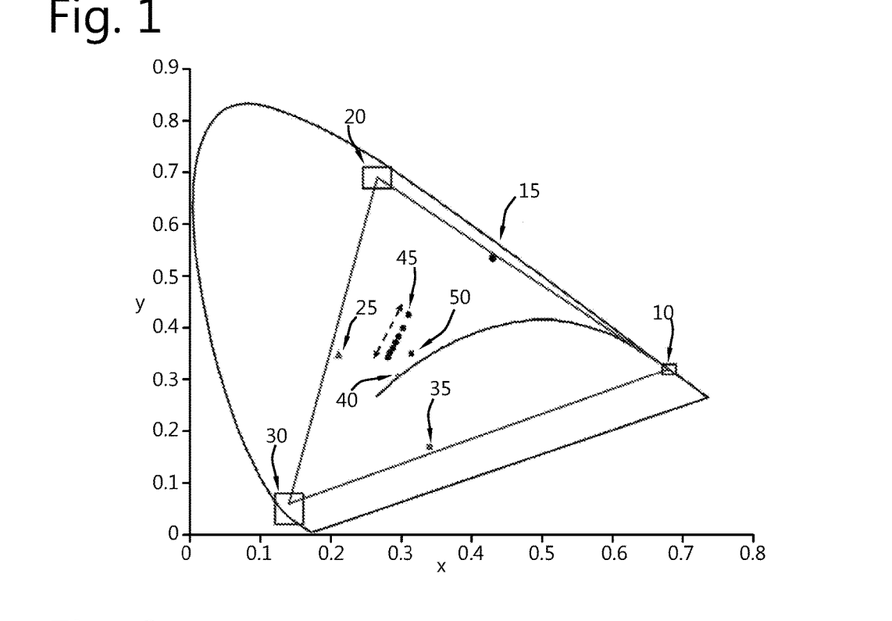
FIG. 1 shows the CIE 1931 color space and DCI color gamut and DCI requirements with respect to primary colors.

FIG. 1 shows the requirements of a color gamut defined in the CIE 1931 color space to comply with DCI requirements. DCI standards require the primary colors red, green and blue to be respectively defined within the tolerance boxes 10, 20, 30 of FIG. 1 and the secondary colors yellow, cyan and magenta, to be respectively enclosed by the reference points 15, 25, 35.

Another DCI requirement is to electronically correct the native white to the target DCI white point, 50. Electronic correction of a primary color in a projection device is performed at the level of the light modulation device. State of the art projection systems comprise three light modulation devices, each being dedicated to a color channel, or a primary color channel. The light modulation device can be a digital micro mirror device (DMD), whose range of operation is reduced when being electronically controlled.

One of the drawbacks of electronically corrected images is that the contrast ratio is lowered. The black level intensity stays status quo but the white level intensity drops when aiming to a dedicated white color point like the DCI white target point. If for example in the spectrum of the light source green light is dominating, this effect of loss of contrast can be dramatic. A second drawback of electronically corrected images is the loss in bit depth (grey scales).

A native white color point which is far from the target white point can lead to a significant loss of contrast ratio and of bits and thereby have a negative impact on image quality.

A third drawback of illuminating the light modulator with light that is not used on screen is the cooling needed to get rid of the absorbed amount of energy. Less light on the modulator means less cooling requirements as well.

These three reasons should make projection manufacturers realize that less electronic correction is needed; thereby resulting in a better image quality and less cooling requirements.

Figure 2A:
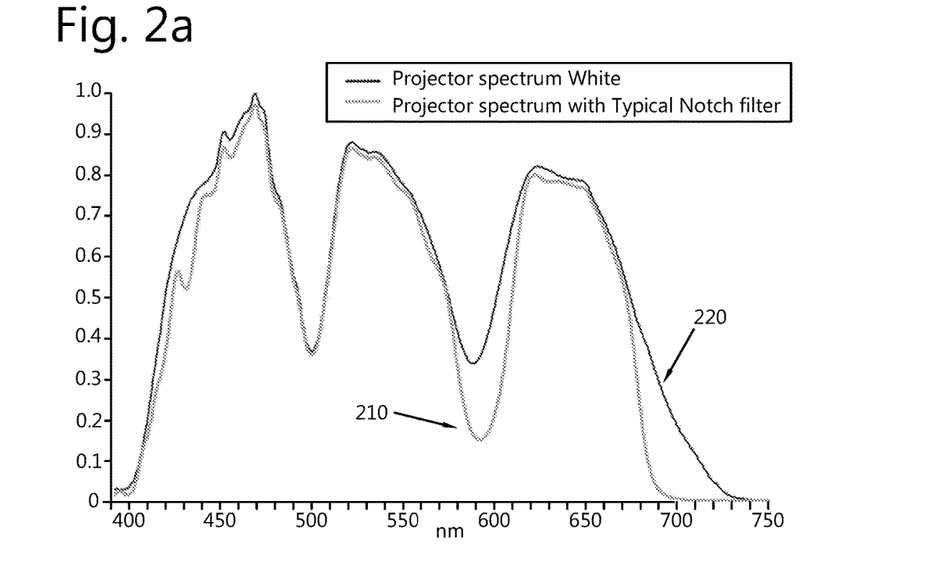
FIG. 2a shows state of the art Xenon white light spectrum and Xenon white light spectrum with a filter.

In the current state of the art of lamp projectors (Xenon lamp), a notch filter is used to obtain the color gamut as described in the DCI standard. Further on, typical light losses due to the electronic correction for correcting the native DCI white point to color corrected white point with a state of the art xenon lamp projector is about 4%. The reason for this low light loss is because the xenon light native white point is close to the target DCI color corrected white point. FIG. 2a shows the spectrum 220 of a typical xenon light and the transmission 210 of a typical filter used in association to the xenon light.

FIG. 1 further shows a resulting color gamut when a xenon illumination is used together with a notch filter. With the notch filter, the native red and green color are situated in the DCI tolerance boxes. The position of the native white with a notch filter is shown with reference 40. Mostly blue light has to be eliminated to match the target DCI target white 50, which implies little losses in contrast ratio and light output.

However, the effect of a notch filter and electronic correction for a laser phosphor light source is very different as for a xenon light source.

State of the art digital projection systems, use solid state light sources, in particular lasers and LEDs, usually arranged in an array, i.e. a laser array, to form a light source and provide the required power. Lasers are usually preferred with respect to LEDs due to the smaller étendue of laser light.

Laser-based solid state projectors could be classified in two main categories:
  Full laser projection systems (using direct red, green and blue lasers)
  Laser phosphor projection systems (using blue laser to excite a wavelength convertor material to generate the three primaries).

Currently the full laser projectors are typically ultra-bright projectors aimed at the niche market of digital cinema (DC). Laser phosphor projectors mainly have a light output under 12K lumens and therefore are sold in the markets outside digital cinema. However, recent improvements in the phosphor technology allow laser phosphor projectors to achieve even brightness levels up to 20K lumens and possibly higher.

High brightness and colour performance are important because a digital cinema projector has to project images according to the DCI standard.

Figure 2B:
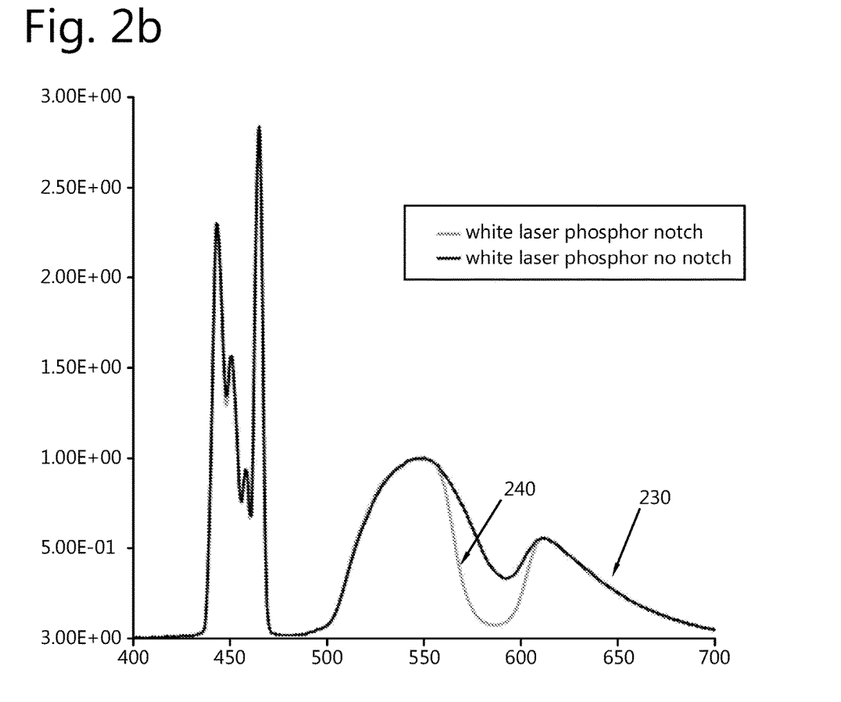
FIG. 2b shows state of the art spectrum for a projector equipped with a blue laser light source with a phosphor, with and without the use of a notch filter.

Laser phosphor projection systems use a single blue laser source, comprising an array of lasers, for simultaneously generating the blue primary color on screen and for exciting a phosphor. The red and the green primary colors are deduced from the phosphor light beam. As the spectrum of a laser phosphor source is very different from that of a xenon lamp spectrum, another type of notch filter is needed to achieve the DCI native standard white point. Blue laser arrays for the blue laser source are preferred instead of blue LED's for the phosphor excitation due to the smaller etendue of laser light The main drawback of a laser phosphor light source with blue lasers and a phosphor is the lack of red light and the excess of green and yellow light in the spectrum of the projected image, as shown in spectrum 230 of FIG. 2b, which is the spectrum of the projected image after the color splitting and recombination taking place in an imaging module. A notch filter for removing yellow light in excess is usually used. The spectrum of the projected image using the laser phosphor light source with the yellow notch filter is shown in the spectrum 240 of FIG. 2b.

Because of the excess of blue and green light, this light has to be electronically removed to match the native white point to the DCI white point. The typical loss of light and contrast ratio is 20% to 30%. This is much higher than for a xenon lamp projector.

Conventional systems will use a typical notch filter and color correction to be DCI compliant for the color gamut. The result of this will be a loss of contrast ratio and bit depth or in general image quality and a higher then needed energy load on the light modulator, thereby generating additional heat in and around the light modulators.

Another problem typical for laser phosphor illuminated systems is the change of the white color point (white color shift) with dimming of the blue lasers for the phosphor excitation. The white point shift is shown by the dots 45 of FIG. 1. The dimming of the blue lasers, which can be due to ageing of the lasers, increases the efficiency of the phosphor with lower blue power on the phosphor. The ratio of yellow to blue light increases with lower blue power and as a consequence the white becomes more yellowish, and the white point 45 shifts. A similar behaviour will occur during the lifetime of the laser phosphor light source.

DCI is used here as an important driver of what is generically called WCG (Wide Color Gamut). Digital Cinema has always been a frontrunner in this requirement of wide color gamut because of the typical link to film-based projectors with their specific color gamut performance.

SUMMARY OF THE INVENTION

It is an object of the present invention to provide a projection system, an optical assembly and a method of operating the system.

The object is provided with a light projection system for generating an image with three primary colors, in particular, blue, green, and red, each primary color being respectively defined by a first, second and third waveband, said light projection system comprising:
  a blue laser source emitting a first blue laser beam of the fourth waveband, said blue laser source having a first laser driver,
  a second blue laser beam having a central wavelength and a fifth waveband,
  a substrate comprising a wavelength conversion element for emitting light at a plurality of wavelengths after absorption of a light beam at an excitation wavelength within the fifth waveband of the second blue laser beam, said substrate being positioned in an optical path of said second blue laser beam such that light transmitted through or reflected from the wavelength conversion element results in emission of a converted beam having a light spectrum comprising at least the second and third wavebands,
  a beam combiner for combining the first blue laser beam and the converted beam, which combination results in a white beam which is provided to an imaging module, the light projection system further comprising:
  a static waveband reduction filter for changing the intensity of light from the wavelength conversion element either in transmission and/or reflection in the second waveband of the white beam, such as to adjust a white point of the light projection system.

The blue primary colour can be mainly provided by the blue laser which means that fourth waveband can be the same as the first waveband. The fifth waveband will mainly be in the range of the second green waveband as well as in the third red waveband. The fourth waveband can be the same as the fifth waveband (i.e. determined by the blue laser).

A notch filter can be placed in the optical path of the white beam to form a modified white beam comprising at least the first, second and third wavebands. This light beam is then passed to the imaging module. The notch filter can be located before or after or with the static waveband reduction filter.

It is an advantage of the embodiments of the present invention that the projection system does not require (or only require) electronic compensation of white point imbalance, i.e., avoiding at least in part the reduction of the range of operation of the imagers having light valves or spatial light modulators like DMDs, and thereby generating loss of contrast ratio and grey levels (bit depth).

It is an advantage of the embodiments of the present invention to provide the imaging module a white beam which comprises three distinct spectral bands which can be split into primary colors and can achieve a good or better pre-balanced white point of the illumination beam so as to avoid or reduce the need for electronic white balance compensation on the imaging devices of the imaging module.

It is an advantage embodiment of the present invention to provide means to combine the contributions of the various primary color wavebands to achieve the desired white point in the projected image.

It is an advantage of embodiments of the present invention to provide new ways to set a white point.

It is an advantage of the present invention to reduce the operating temperature of the imaging chip, by reducing the intensity of one of the wavebands before the imaging module, such as to avoid or reduce the need for electronic correction. In particular, the static green waveband reduction filter allows the removal of excess green light, which is thereby not provided to the green channel of the imaging module. So there is less light energy in the respective green color channel, whereby there is less cooling required. This reduction in cooling requirements results in a variety of advantages such as less noise, an increased lifetime, a higher reliability, etc.

Advantageously, the second blue beam is provided by splitting said first blue laser beam into said first and second blue laser beams.

Advantageously, the first and second blue laser beams are provided by means of at least one of a beam splitter, polarization diversity, wavelength diversity, spatial or angular diversity applied to said first blue laser beam.

Preferably, at least one or both of the first or second blue laser beams is provided with intensity reduction means.

Advantageously, said intensity reduction means comprise neutral density filters.

Advantageously, said neutral density filters of different densities are arranged in a color filter wheel.

Advantageously, the transmission of the static waveband reduction filter is selected (via the selection of material) to set the relative intensity of the first, second and third wavebands of the modified white beam to thereby set the white point.

Advantageously, the static waveband filter comprises a coating for setting an intensity of the second green spectral band.

Advantageously, the notch filter and the static waveband reduction filter are combined in a combined static filter.

Advantageously, a first side of the static waveband reduction filter is coated with a narrow band notch filter and a second side of the filter is coated with the static waveband reduction filter.

Advantageously, the static waveband reduction filter is configured to reduce the intensity of wavelengths comprised in the range 510-570 nm or 580 nm.

Advantageously, the notch filter reduces light intensity of wavelengths in the waveband 570-600 nm or 620 nm, preferably with a transmission comprised in the range 10-15 or 10 to 20%.

Advantageously, the projection system further comprises beam homogenization optics.

Advantageously, the projection system further comprises despeckling means.

Advantageously, the blue laser source comprises an array of individual lasers, the intensity of each individual laser being controlled by a laser driver and wherein the intensity of each laser can be varied, e.g. by pulsing the laser.

Advantageously, the wavelength conversion element is a phosphor or quantum dots.

In a further aspect the present invention provides an optical assembly for use with a light projection system for generating an image with three primary colors, each primary color being respectively defined by a first, second and third waveband, the light projection system having a blue laser source emitting a first blue laser beam of the first waveband, said blue laser source having a first laser driver, a second blue laser beam having a central wavelength and a fourth waveband, e.g. lying in a wavelength range of less than 495 nm, e.g. 380 to 495 nm; and an imaging module.

The present invention in another aspect provides a method for generating an image with a light projection system, the image having three primary colors, each primary color being respectively defined by a first, second and third waveband, the method comprising generating a first blue laser beam having a fourth waveband, said blue laser source having a first laser driver, generating a second blue laser beam having a central wavelength and a fifth waveband, emitting light at a plurality of wavelengths from a substrate comprising a wavelength conversion element for absorption of a light beam at an excitation wavelength within the fifth waveband of the second blue laser beam, said substrate being positioned in an optical path of said second blue laser beam such that light transmitted through or reflected from the wavelength conversion element results in emission of a converted beam having a light spectrum comprising at least the second and third wavebands, combining the first blue laser beam and the converted beam, which combination results in a white beam comprising at least the first, second and third wavebands and providing the white beam to an imaging module, the method further comprising:

filtering in the second waveband of the white beam using a static waveband reduction filter provided in the optical path of the white beam, the static waveband reduction filter filtering incident light to thereby set a white point of the light projection system.

Any of the filters can be reflecting or transmitting filters or combinations of these can be used.

DEFINITIONS

As the present invention is related to improvements in the generation of colors for projection systems, several terms used throughout the current description are provided hereby.

Any or all of the filters can be reflecting or transmitting filters. For example, the various transmissions of the colors of the waveband reduction filter can be provided by reflections of a reflective waveband reduction filter or transmissions of a transmissive filter or a combination of these.

In a projection system, the definition of a primary color is complex as it depends where the primary color is defined in the optical path, i.e. in each color channel, at the level of the light modulator devices, upstream of the light modulator devices, or at the output of the projector. It is very often that in projection systems the three primary colors are red, green and blue.

In optical terms, a primary color in a projection system is defined as "One color element of three colors, in an additive imaging system, which can be combined in various proportions to produce any other color." Each primary color can be further defined, according to a standard, for example DCI standard. It is important to note that a primary color can also be defined in a standard via its color coordinates. A certain waveband and a certain spectral distribution inside this waveband may create a certain color coordinate that is equal to the one defined in a standard. However, different solutions exist with differences in waveband and spectral distributions that can create the same color coordinates.

White point is defined, in additive imaging systems, as "the color (or chromaticity coordinates and luminance) that is produced when the system is sent the maximum RGB code values that it can accept", as defined in Color and Mastering for Digital Cinema by Glenn Kennel, 2006, ISBN-10:0240808746. Further, the text book specifies that "DCI specifications and SMPTE Standard for Screen Luminance and Chromaticity, the white point is defined as having chromaticity coordinates [0.314 0.351]". However, this definition of white point is optional, and further the definition used depends on the standard followed.

The definition of white point depends on the application. Therefore, the projector white point (or native white point), and the target white point are to be defined. The projector white point (or native white point) is the white point when all three color channels provide their maximum level. The target white point is the standard the projector should reach.

White point shift is the drift of the projector white point with time or with dimming of the illumination levels.

In a similar manner, the target primary colors are the primary colors defined by a standard, i.e. DCI standard, and the projector primary colors (or native primary colors) are the primary colors provided to each color channel or light modulator device. Native primary colors therefore have no electronic correction.

It is clear that the projector primary colors define the projector white point, however, the target primary colors do not necessarily define the target white point.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions unless it is specifically stated as such. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Figure 3:
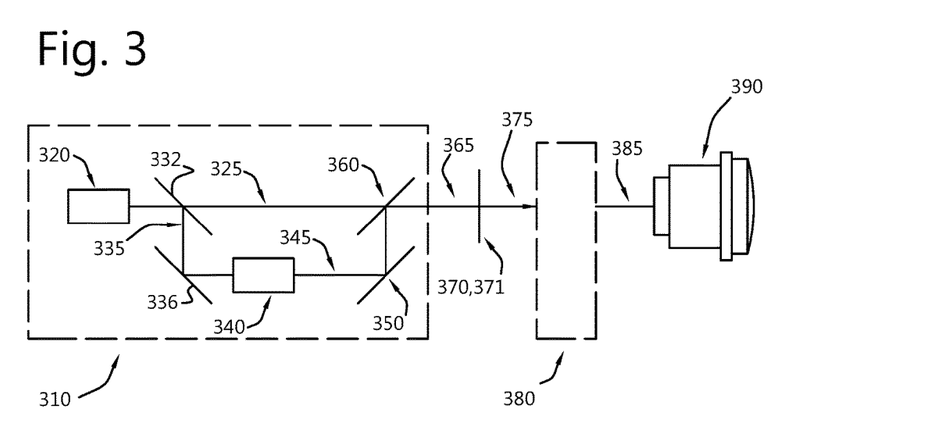
FIG. 3 shows a schematic representation of a projection system according to an embodiment of the present invention.

With reference to FIG. 3, an embodiment of the invention of a light projection system will be described. FIG. 3 schematically shows a light illumination module 310 and an imaging module 380. The light illumination module 310 generates a white light beam 365 which then enters the imaging module 380, where the white light beam is split into three primary color beams, such as red, green and blue, each primary color beam being directed to a respective spatial light modulator or light valve (for example a DMD) to produce an image of each primary color. Alternatively the three beams can be imaged sequentially on one spatial light modulator or light valve (not shown). The three primary color beams are recombined in a beam 385, which after a projection lens 390, produces a projection image.

The light illumination module 310 according to an embodiment of the present invention comprises a laser light source 320 emitting blue light, in a first waveband the blue laser source 320 provides a first blue laser beam 325 which can contribute to the blue primary color of the projection image and a second blue laser beam 335 provided by means for splitting a beam 332, such as a beam splitter. In the optical path of said second blue laser beam 335, a first mirror 336 can redirect the second blue laser beams towards a static wavelength conversion element 340 that converts the second blue laser beam 335 into a converted beam 345. Use of the mirror 336 is optional, the skilled person will be ware that the second blue laser beam can be generated by other means.

The blue laser source 320 can emit light in a waveband of 380 to 495 nm for example. Note that towards the shorter wavelengths of the range, the human eye sees the blue as violet. As the blue laser source 320 produces light that is used for the blue primary color (or the blue waveband of the imaging module), this light source determines the visual perception of "blue images". In practice often only a small waveband interval is needed, around 465 nm, for instance laser wavelengths of 450 to 470 nm. Below 450 nm, the blue becomes very violet. This might be useful for certain applications.

The second blue laser beam 335 is dedicated for excitation of a wavelength conversion element, such as a phosphor or quantum dots. Theoretically, this excitation may be induced by any wavelength that excites the wavelength conversion element, such as the phosphor (as given by the absorption spectrum of the wavelength conversion element), e.g. shorter than 495 nm or in the mentioned 380 to 495 nm interval. The skilled person will appreciate that lasers for exciting the wavelength conversion element, such as the phosphor are not limited to the waveband corresponding to blue light, and lasers with wavelengths lower than 380 nm, i.e. UV light sources such as UV lasers, are also suitable for exciting the wavelength conversion element, such as the phosphor.

Therefore, depending on the requirements to be fulfilled by the projection system, different types of lasers can be selected.

In preferred embodiments, the light source has a full width at half maximum (FWHM) of approximately 5 nm, e.g. like a laser. Also the emission angle should be small like that of a laser as this keeps the etendue to a low value suitable for use with spatial light modulators like a DMD.

For example, the laser source 320 can emit a light beam having a central wavelength of 465 nm, with a waveband of +/−5 nm or emit a light beam having a central wavelength of 445 nm, with a waveband of +/−5 nm or any other laser or equivalent in the fourth waveband.

The laser source can comprise an array of lasers. In an embodiment of the present invention, the laser source 320 can comprise an array of 3×3 lasers, i.e. 9 lasers or, for example 8×8 or 64 lasers. The laser source can be a laser diode. Laser arrays commonly use a single laser diode type and provide multiple laser beams. A laser beam for use in embodiments of the present invention can include multiple laser beams. In the same manner, a driver can comprise a plurality of sub-drivers, driving each laser of the array of lasers in a different manner.

Means 332 for splitting the first blue laser beam into a first blue laser beam for providing or contributing to the blue primary color and a second blue laser beam for excitation of the wavelength conversion element can be provided by means of at least one of a beam splitter, polarization diversity, wavelength diversity, spatial or angular diversity.

In this or any of the embodiments according to the present invention, the intensity of the first blue laser beam 325 with respect to the second blue laser beam 335 (or vice versa) can be controlled by means of intensity reduction means, such as a neutral density filter wheel with various neutral densities provided after splitting of the beams. Said neutral density filter wheel can be provided in both or in only one blue beam, such that the intensity of the primary blue laser beam is controlled independently of the intensity of the other wavebands. The neutral density filter wheel can be controlled by means of a controller such as a microcontroller. This embodiment allows the use of a laser driver, and provides means to adjust the intensities of the two blue beams independently.

The static (not moveable in operation) wavelength conversion element 340, after absorption of a light beam at an excitation wavelength, emits a light beam, by transmission or reflection, whose wavelength band(s) is/are altered with respect to the wavelength of the absorbed light beam.

Wavelength conversion element 340, after absorption of the second blue beam 335, emits a converted beam 345 which comprises green and red light or comprises green, yellow and red light, e.g. light is emitted in the waveband of 500 nm to 700 nm with a peak at around 570 nm. Wavelength conversion element 340 can be a phosphor. The phosphor can be selected (material selection for example a phosphor of the type YAG:Ce) to convert the blue emission of the second light beam centered on the 445 nm wavelength to light emitted in the waveband of 500 nm to 700 nm with a peak at around 570 nm, so that it serves simultaneously for generating green light and red light. However, depending upon the color gamut standard to be achieved, the spectrum can show a lack of red light and an excess of green light and/or of yellow light.

Wavelength conversion elements can work both in transmission or reflection. Typically the wavelength converted could show a very isotropic emission in all directions, but there is also involvement of the substrate to which the wavelength converted layer is attached. For instance if this is a reflective substrate, all converted light from the wavelength converter in the transmissive direction will be back-reflected as well.

In other embodiments of the present invention, the wavelength conversion element 340 can be a phosphor, whose characteristics depend on the native colors the projection system shall provide. Quantum dots could be used as well as wavelength conversion elements.

Figure 4:
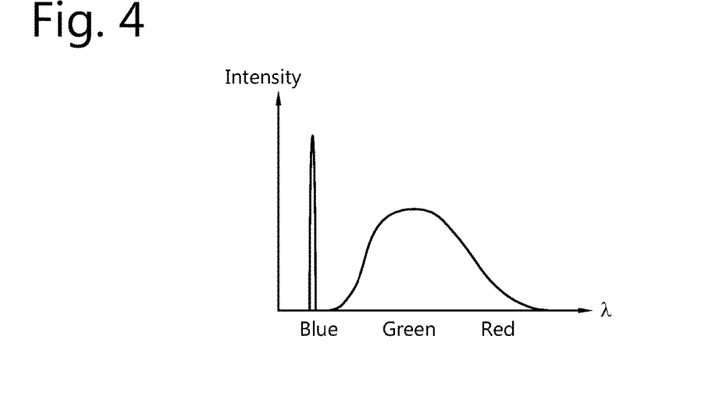
FIG. 4 shows the spectrum of the light beam at the exit pupil of the illumination module of FIG. 3, according to an embodiment of the present invention.

Downstream of the wavelength conversion element 340, a beam combiner 360 combines the first blue laser beam 325 and the converted beam 345, which combination results in a white light beam 365. The converted beam is no longer a laser beam as the laser quality is not provided by the wavelength conversion element. FIG. 4 is a schematic representation of the spectrum of the white light beam 365. The intensity of the native blue, generated by the blue laser source 310, is a well-defined peak, however, the primary red and green are found in a larger waveband range. The larger waveband range corresponds to a typical spectrum obtained with a phosphor of the type YAG:Ce, which shows a peak as shown in FIG. 4 in the waveband range corresponding to approximately 500-700 nm.

The white light beam entering the imaging module 380 is preferably a white beam which has three distinct wavebands, e.g. red, green and blue, advantageously wherein the intensity of each waveband is the same, for example within 5% from each other. Having the same or nearly equivalent intensity in each waveband ensures a projection system achieving the target white point.

Figure 8:
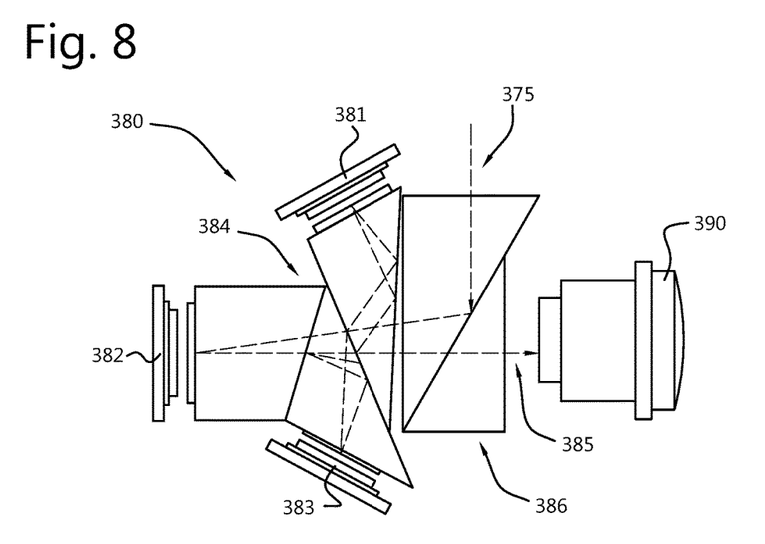
FIG. 8 shows an embodiment of an imaging module for use with embodiments to the present invention.

An imaging module 380 used with embodiments according to the invention is illustrated in FIG. 8. A three-chip imaging module is shown but the present invention also includes within its scope a single chip imaging module (not shown) whereby the red, green and blue beams are applied sequentially to the light valve. For most of the 3-chip projectors the splitting of the light beam generated by the illumination module 310 in the three primaries is done by a Philips prism 384 as shown in FIG. 8. The Philips prism 384 is also responsible for the initial filtering of the light. This filtering is a result of the typical difference of Angle Of Incidence (AOI) on the Philips prism coatings for incoming and outgoing light. The exact wavelength ranges affected depend on the coating design used in the prism (e.g. dichroic coatings) but a typical case is that a dip around 490-500 nm and around 575-600 nm are created, as shown in the spectrum 230 of FIG. 2*b*.

However, although a functioning system has been obtained, the red and green primaries obtained in this way are still too broad to be DCI compliant. The colour points are not in the corresponding DCI tolerance boxes. The white light beam 365 exiting from illumination module 310 has an excess of green light and yellow light and a lack of red light. A first yellow notch filter 370 can be placed in the optical path of beam 365, before the entrance pupil of the imaging module 380. The effect of this yellow notch filter is illustrated in the spectrum 240 of FIG. 2*b*. It reduces the contribution of wavebands not contributing to the generation of primary colors, i.e. green and red, improving the color gamut in order to make it compliant to a standard like the DCI standard. In other words, the yellow notch filter partly reduces the wavelengths around 570-600 nm. These wavelengths are typically on the low side for red light (hence orange-ish) and on the high side for the green light (hence yellowish). Reducing them prevents them from contributing to the red and green primary, moving the green color point to the upper left direction and the red color point to the lower right direction in the color diagram, thereby increasing the color gamut "triangle" in-between them.

The yellow notch filter can, for example attenuate the light in the narrow waveband 570-600 nm, preferably with a transmission as low as possible, for example around 10-15% or 10 to 20%. To the user, the use of this filter results in a green which appears less yellowish and a red which appears less orange, and therefore, a native white point with less yellow.

However, light beam exiting said yellow notch filter 370 can still exhibit an excess of green light.

The converted beam 345 can be used to generate of red and green primary colors. As the second blue laser beam 335 contributes to the creation of red and green primary colors rather than providing blue light itself, the requirements for the blue lasers considering the second blue beam are less stringent and a cheaper blue lasers can be used, such as a blue laser diode which emits light at 445 nm, which are easy to procure. The main requirement related to the second blue laser beam is the central wavelength which should be suitable for exciting the wavelength conversion element such as the phosphor. Laser diodes at 445 nm are compatible with the excitation wavelength of the phosphor in the described embodiment according to the invention.

On the other hand, the blue laser source 320 fully contributes to the blue primary color and therefore the choice of the central wavelength emitted by the blue laser source is an important parameter as well as the related optical requirements. A native blue color with central wavelength of 465 nm provides a native blue compatible with the target blue of DCI standards. The skilled person will appreciate that the choice of wavelengths range, or wavebands, strongly depends on the standards and available light sources and variations may be necessary with respect to the value selections mentioned above. The choice of wavebands in the present embodiment are not limiting and depend also on the lasers currently available on the market, other wavebands without departing from the spirit of the present invention are of course conceivable. The choice of waveband is an optical design parameter.

In accordance with embodiments of the present invention, a static green light reduction filter 371 configured to reduce the amount of green light is further provided between the light illumination module 310 and the imaging module 380. In a preferred embodiment, the green light reduction filter 371 is configured to reduce uniformly the amount of green light, preferably for all wavelengths generating native green primary color (such that the green color point remains stable), and thereby reduce the amount of green light contribution to the white balance. For example, the green light reduction filter 371 can reduce wavebands in the range 510-570 nm, and wherein the reduction factor is as constant as possible over this spectral range. In a first embodiment, the transmission of green light with this green light reduction filter can be situated in the range of 70 to 80%, or 70 to 85%.

The reduction in intensity of any primary color or even waveband not contributing to the generation of primary colors before the imaging module advantageously reduces the amount of light not used for the projected images entering the imaging module 380, thereby reducing heating of the projection system and improving thermal management control. Advantageously, no (or less) compensation in the light modulation device (DMDs) of the imaging module is required, thereby maintaining the maximum number of bits in each channel corresponding to each primary color and thereby increasing the bit depth and improving contrast.

Figure 7:
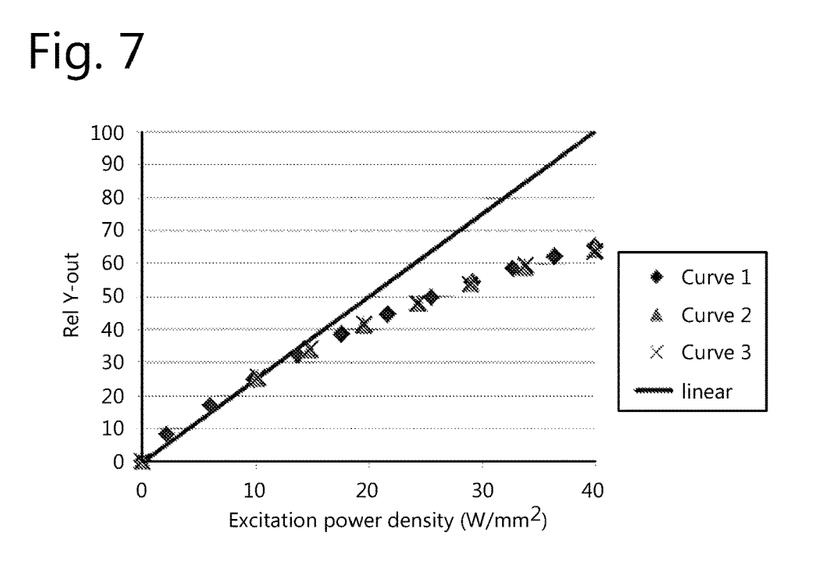
FIG. 7 shows examples of the typical non-linear behaviour of an emitted light output from a phosphor as a function of an increasing excitation power level.

A possible drawback of laser phosphor sources is the changing efficiency of the phosphor as a function of the power of the laser source. This causes the white color point to shift with dimming or aging of the lasers. This is shown in FIG. 1, wherein the native white color point 45 is becoming more yellow as a function of lower blue power on the phosphor. FIG. 7 shows a non-typical behaviour of the emitted light output of the phosphor used in a light module as a function of the incident blue laser power level. This behaviour lies at the origin of the white point shift when the power level is decreasing, for instance over lifetime (when the blue lasers for exciting the phosphor reduce in power level). The blue laser light that excites the phosphor is aimed at a certain spot on the phosphor layer. This spot is quite small, typically a number of $mm^2$. The emitted light is collected from that same spot. All the power is aimed at the spot, so this could lead to quite dense blue illumination, i.e. 50 $W/mm^2$ or more in the higher light output projectors. When the lasers age or get dimmed, less power will fall on the same spot on the phosphor. At these illumination/ excitation density levels, phosphor typically exhibits a non-linear conversion. The collected light beam intensity or light output tends to saturate when the illumination density gets higher. At least two root behaviours are at the origin:

As the excitation density increases, the temperature increases on the phosphor and the phosphor will convert less efficiently ("thermal quenching")

As the excitation density increases, more and more phosphor conversion centers will be occupied in the job of absorbing a photon and emitting another one, so that less free conversion centers will be available. This leads to another saturation effect.

This saturation effect is shown in the graph, the converted light output doesn't grow linearly with the excitation light input.

Due to the excess of blue and green light in state of the art laser-phosphor system, contrast and bit depth are lowered when matching the target white point and the native white point of the projection system. A goal of embodiments of this invention is to match the native white point of the projection system to the target white point defined by the DCI standard (or any other standard or proprietary requirement), without losing some contrast ratio and/or bit depth.

The present invention provides a single blue laser source, in the sense that the blue laser beam for generating the blue primary color and the blue beam for exciting the wavelength conversion element are driven with the same laser driver, as in prior art laser phosphor projectors. In which case, the light beam exiting said green light reduction filter 371 still exhibits an excess of blue light (not shown). Other arrangements of laser sources are included within the scope of the invention.

Figure 6:
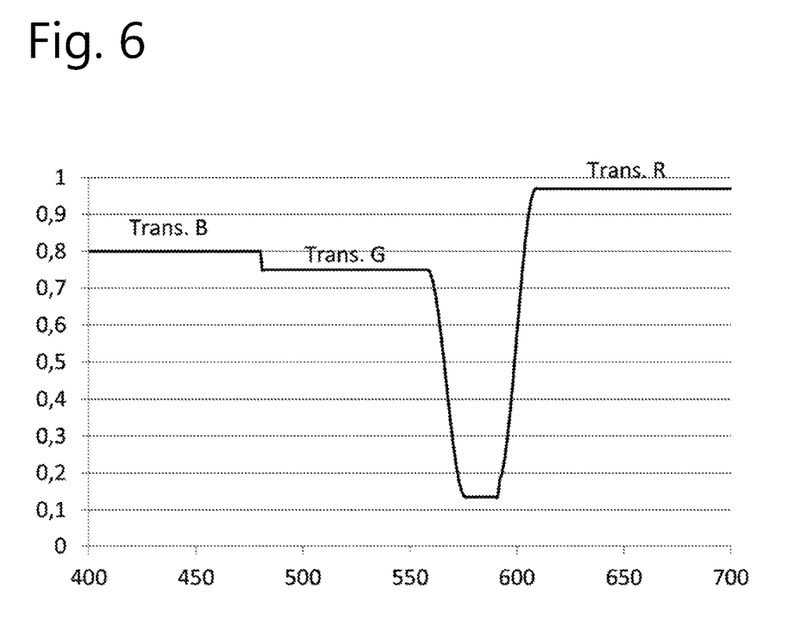
FIG. 6 shows the transmission function of a static waveband reduction filter according to an embodiment of the present invention.

In accordance with embodiments of the present invention, a blue light reduction filter 362 is added or combined to the already provided filters (370, 371). In an embodiment of the present invention, the various waveband reduction filters are combined in the same filter 370. The transmission function of an embodiment of a waveband reduction filter according to the present invention is illustrated in the graph of FIG. 6, wherein the combined filter 370, 371 transmits about 13% of yellow light, 75% of green light, 80% of blue light and transmits nearly all of the red light. When the light beam 365 exits said static waveband reduction filter 370, the modified white light beam 375 comprises three well defined spectral wavebands closely matching the spectral bandwidths of the predefined primary colors, or target primary colors.

The various transmissions of the colors of the waveband reduction filter (or reflections of a reflective waveband reduction filter) are adapted to the optical design of the projection system, i.e. they depend on the elements used within the projection system, their transmission, their optical quality, etc.

To compensate for the ageing of lasers, and/or for the ageing of the wavelength conversion element 340, and advantageously to further reduce the amount of blue and/or green light inherent to the laser phosphor system described in the present embodiment, it is an advantage of the present invention to provide means to adjust the relative contribution of each waveband in order to generate native primary colors matching as much as possible target primary colors. As a result, each native primary color fed to the imaging module matches the required set of color coordinates for example as defined in the DCI system and thereby matches the target white point without losing contrast nor bit depth, even when the lasers or other optical components are aging.

The static green waveband reduction filter adjusts the amount of green light transmitted through said filter. Advantageously, the reduction of the green light contributing to the primary green color upstream from the imaging module hinders the reduction of green light by the corresponding DMD, thereby keeping the movement range of the DMDs to its maximum, and thereby maintaining the bit depth associated to said color channel. The static green waveband reduction filter can be provided by a coating on one of both sides of the filter.

Figure 5A:
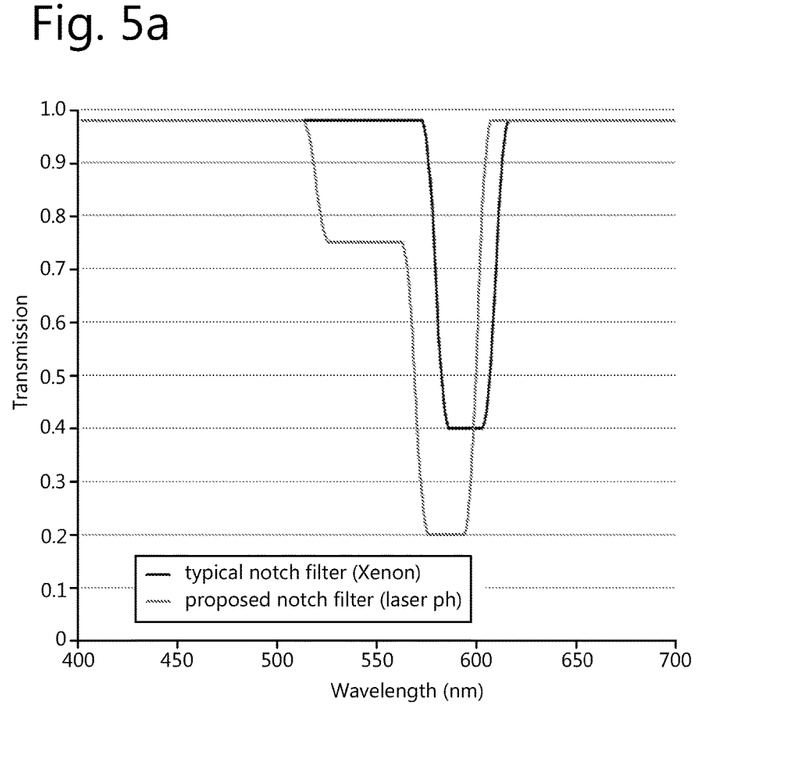
FIG. 5a shows the transmission function of a yellow notch filter according to the state of the art in comparison with the transmission function of a combined static waveband reduction filter and notch filter according to embodiments of the present invention.
Figure 5B:
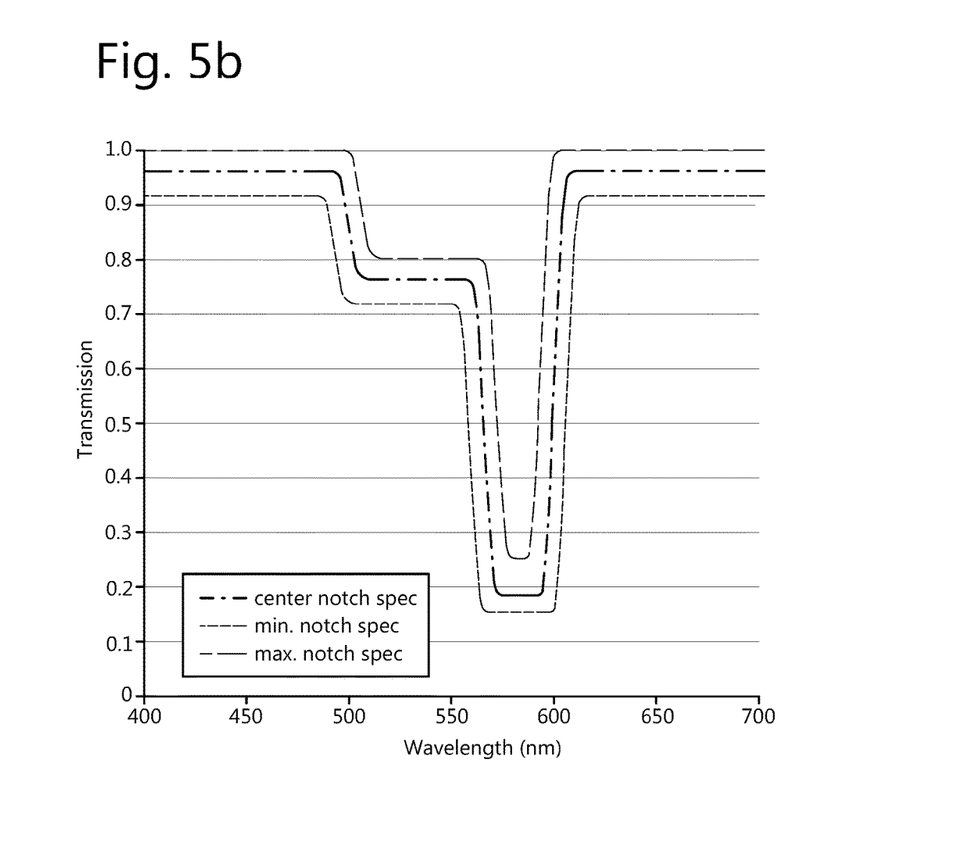
FIG. 5b shows the transmission function of the static waveband reduction filter according to embodiments of the present invention, indicating tolerances.

Preferred embodiments of the present invention combine the static waveband reduction filter 371 with the yellow notch filter 370. An example of such a filter comprises the green coating on one side, and the coating of the yellow notch filter on the other side. As a consequence, the projection system may only restrict the yellow light from entering the imaging module or further adjust the amount of green light, as a function of the performance of the system (ageing of the lasers, phosphor, wavelength conversion element 340) and the desired optical output. The transmission spectrum of such a combined notch and green waveband reduction filter ("laser ph") with a conventional notch filter ("notch filter Xenon") is shown in FIG. 5a. The green waveband reduction filter 371 reduces the transmission in a wavelength range 520 and 570 nm, e.g. in the magnitude of 70 to 80%, whereas the notch filter 370 associated with it reduces to a much lower level, e.g. 15 to 30%, and in a higher wavelength range, e.g. 580 to 620 nm. As shown in FIG. 5b, a tolerance range should preferably be specified for this combined notch and green waveband reduction filter, which should be brought into conformity in relation to the spread on the Philips prism coatings (FIG. 8), as an overcompensation could lead to undesired colour primaries. The tolerances should be provided to the manufacturer of such filters.

Although it is preferred to make filters that are tailored to the desired filter spectrum, the filter spectrum of FIG. 5b can be formed less elegantly by a long pass filter such as a 475 nm Longpass Filter from Edmund Optics Ltd., USA, Stock No. #64-633 which suppresses short wavelengths and has a cut-on of 475 nm and NF594-23 from Thorlabs Inc. USA which has a notch wavelength range 572 to 616 to be used as the notch filter. The green waveband reduction filter can be provided by a filter NF533-17 from Thorlabs which has a notch of 517 to 548 nm in combination with the filter NF561-18 with a notch of 542 to 580 nm and the N514-17 with a notch range of 496 to 532 nm, the three forming together a green blocking filter in the wavelength range of 496 to 580 nm. The white beam can be split into an 80% beam and a 20% beam. The 20% beam is filtered using the combination of NF533-17 and NF561-18. The 80% beam is filtered with NF594-23 notch filter and the longpass #64-633 filter. The filtered 20% beam and the filtered 80% beam are then combined.

The green waveband reduction filter 371 reduces the transmission in a wavelength range 520 and 570 nm, e.g. 60 to 80%, whereas the notch filter 370 associated with it reduces to a much lower level, e.g. 15 to 30%, and in a higher wavelength range, e.g. 580 to 620 nm.

FIG. 5b shows optional tolerances that can be used to specify the spectral details to a manufacturer of such filters. The tolerance in the flat portions of the spectrum is typically up to plus or minus 5%. The tolerance in the steep flanks is up to plus or minus 5 or plus or minus 7 nm, for example.

Optionally a plurality of waveband reduction filters can be provided which can be interchanged manually, e.g. when calibrating a projector. Each individual filter has a different transmission, for example a set of 8 filters can be provided with transmissions of respectively 20, 30, 40, 50, 60, 70, 80, 90% for the green waveband. Each individual waveband reduction filter can be associated with a yellow notch filter, as discussed here above. The green waveband reduction filters 371 can preferably reduce wavebands in the range 510-570 nm, wherein the reduction factor is as constant as possible over this spectral range.

A consequence of the new filtering characteristic according to the present invention, which comprises a combination of the yellow notch filter and the green waveband intensity reduction filter is a reduction of the green excess light in the illumination going towards the imaging module 380, thereby improving the final contrast, bit depth, and white point achievable.

The skilled person will appreciate that a similar waveband reduction can be implemented for other colors, i.e. for adjusting the contribution of other wavebands to the creation of the final projected image or improving the white point definition or even adapting the white point, thereby increasing the number of degrees of freedom to adjust the white point, thereby preserving the maximal range of the imagers like the DMDs.

Such filters can be advantageously added to the projection system also to create new effects on the final image, a new white point definition adapted to certain movies, to a new cinematographic language or new effects. Advantageously, filters designed for reducing wavebands associated to blue, red, cyan, magenta and/or even yellow could contribute to another definition of primary colors at the entrance of the imaging module. The choice of such filters depends on the optical design of the entire projection system, i.e. choice of lasers, optics, lenses, mirrors, dichroic mirrors, beam combiners, etc.

Advantageously, the native blue color of the first blue laser beam 325 can be varied in intensity by changing the power of the blue laser source or by pulsing said laser source, and the native green can be tuned by changing a neutral density filter in the optical path of the second blue laser beam 335. However, changing the intensity of the second blue laser beam 335 changes the intensity of the green native color but also of the red native colour. Therefore, the red color channel cannot be increased, or decreased independently of the green, but the green color channel can be decreased independently of the red, with the waveband green reduction filter 371. These two control means, provide two degrees of freedom to set the native white point within the color space.

In the embodiments of the present invention, red color is not controlled independently, and it is preferred to set the white point with the green color, in accordance with the spectrum of FIG. 4. In the described embodiment there is no need to reduce the contribution of red. As the invention is not limited to the described laser sources, the skilled person is aware that another optical design can have an excess of red light, or even less red light contribution than in the previously discussed embodiment, and thereby means to reduce or increase the amount of red light can be provided in an alternative embodiment. Means for reducing the contribution of red light be can be similar to those for reducing the contribution of green, with a light reduction filter, so as to reduce the amount of red independently of the green channel.

The locations of the various optical elements, providing means to change the contribution of various wavebands, such as the yellow notch filter 370 or the static green waveband reduction filter 371, can vary with respect to the presently described embodiments, as long as the light beam of each color channel, after the light modulation device, or DMD, is a corrected native primary color of said color channel, before the three primary colors are recombined to a single beam for projection. Therefore, the spectral correction performed to match the target primary colors for each color channel, should be provided upstream of the recombination of the modulated color channels.

All the optical components in the projection system optical path may have some influence on the emitted spectrum. For example, even the projection lens can exhibit a lower transmission in blue than in green. The white point which has to comply with the requirements is the white point of the projected image. Therefore, it can be important to take into account the influence of each optical element on the light spectrum of the final projected beam. This contribution can be taken into account in calibration, if the spectrum of the white beam is measured upstream of the projected image. This calibration can be used to adjust the various contributions of wavebands in the light beam to compensate for losses in various optical elements.

FIG. 8 shows is an embodiment of an imaging module 380 which can be used with the present invention. The imaging module 380 comprises three DMDs 381, 382, 383, one for each color channel, and an optical element, such as a Philips prism 384, which splits and recombines the three color channels before the projection lens 390. The yellow notch filter 360 or the static green light reduction filter 371 can, in embodiments of the present invention, be provided directly on the Philips prism 384, in their respective channels.

The present invention is not limited to a Philips prism. Alternative color beam splitter and recombination solutions can also be implemented, for instance color cubes or arrangements with a number of dichroic mirrors. Philips prisms provide an advantage of being very compact, is particular for use with reflective devices such as DMDs.

An embodiment of the present invention also includes the provision of an optical assembly for use with a light projection system for generating an image with three primary colors, each primary color being respectively defined by a first, second and third waveband, the light projection system having a blue laser source (320) emitting a first blue laser beam (325) of the first waveband and lying in a wavelength range of 380 to 495 nm, said blue laser source having a first laser driver, a second blue laser beam having a central wavelength and a waveband, and an imaging module (320).

Such a light optical assembly can be used to retrofit a projector or to provide a projector in modular form. The optical assembly can include:

a substrate being arranged to be positioned in an optical path of the second blue laser beam and being positioned to receive the second blue laser beam, the substrate comprising a wavelength conversion element (340) for emitting light at a plurality of wavelengths after absorption of a light beam at an excitation wavelength within the waveband of the second blue laser beam, light transmitted through or reflected from the wavelength conversion element resulting in emission of a converted beam (345) having a waveband comprising at least the second and third wavebands, a beam combiner (360) being positioned and adapted for combining the first blue laser beam and the converted beam, which combination results in a white beam (365), comprising at least the first, second and third wavebands provided to the imaging module (320), the optical assembly further comprising:

a static waveband reduction filter (371) provided in the optical path of the white beam (365), the static waveband reduction filter (371) filtering in the second waveband of the white beam (365) to set a white point the light projection system. The optical assembly can include all the relevant components as described in embodiments of the present invention.

We will use the general term "primary color control means" to refer to the means described previously for controlling the contributions of the various wavebands, i.e. the driving of the intensity of the blue laser source 320, the control of the neutral density filters in the first 325 and second 335 blue beams, and the static green waveband reduction filter 371, etc. These means can be provided to the projection system separately or in any combination, depending on the degrees of freedom to be controlled and on the desired white point correction.

The projector system can be calibrated periodically as well as the calibration of the primary color control means. This can be a system start up or shut down, during periodic calibrations of the system, for example before each projection, or on a monthly basis etc. Calibration can also be performed before a projection, with a predefined test pattern. The calibration will set the driving levels for the drivers of the laser source and/or check whether the static green waveband reduction filter need replacing, and/or change the position of a neutral density filter accordingly so that the desired brightness level is reached for the projector at a certain desired (and stabile) white point. And on a second level this approach can also be used to correct for any difference of the individual primary color points from the projector.

In the presently described embodiments of the present invention, light source 320, is advantageously a laser light source, comprising an array of lasers. An advantage provided by laser light sources is that a laser provides a collimated light beam with a small etendue. However, although less preferred, the invention is not limited to laser light sources, and can also comprise LED light sources or superluminescent diodes.

For laser sources that provide direct illumination for a certain waveband of light in the imaging module, without any wavelength conversion element in the optical path, it may be beneficial to add despeckling means to reduce speckles in the final image on screen (in that primary color). Such despeckling techniques may comprise polarization diversity, wavelength diversity, spatial and angular diversity, whose advantages provide a reduction of speckles in the projected image.

The projection system according to the present invention advantageously comprises beam homogenization optics.

Embodiments of a projection system according to the present invention comprising the static green waveband reduction filter allow the removal of excess green light, which is thereby not provided to the green channel of the imaging module. So in the respective green color channel, there is less heating and hence less cooling is required. This reduction in cooling requirements results in less noise, an increased lifetime, a higher reliability, etc. Also wider color gamuts within the color space can be provided by the primary color control means described in the present patent application. As there is a tendency now to move to wider color gamut also for other applications (in extremum the Rec 2020 gamut), the invention described can also have an application for such Wide Color Gamut activities more generically than DCI.

The invention claimed is:

1. An optical assembly for use with a light projection system for generating an image with three primary colors, each primary color being respectively defined by a first, second and third waveband, the light projection system having a blue laser source emitting a first blue laser beam of a fourth waveband, said blue laser source having a first laser driver, a second blue laser beam having a central wavelength and a fifth waveband, less than 495 nm, optionally in the range 380 to 495 nm and an imaging module, said light optical assembly comprising:
- a substrate being positioned in an optical path of the second blue laser beam and being adapted to receive the second blue laser beam, the substrate comprising a wavelength conversion element for emitting light at a plurality of wavelengths after absorption of a light beam at an excitation wavelength within the fifth waveband of the second blue laser beam, light transmitted through or reflected from the wavelength conversion element resulting in emission of a converted beam having a light spectrum comprising at least the second and third wavebands,
- a beam combiner being positioned and adapted for combining the first blue laser beam and the converted beam, which combination results in a white beam, comprising at least the first, second and third wavebands, for providing to the imaging module, the optical assembly further comprising:
- a static waveband reduction filter provided in the optical path of the white beam, the static waveband reduction filter filtering in the second waveband of the white beam to set a white point of the light projection system.

2. The optical assembly according to claim 1, further comprising a notch filter arranged to be placed in the optical path of the white beam to form a modified white beam.

3. The optical assembly according to claim 1, further comprising means for splitting said first blue beam into said first and second blue laser beams.

4. The optical assembly according to claim 3, wherein intensity reduction means for use with at least one of the first or second blue laser beams.

5. The optical assembly according to claim 4, wherein said intensity reduction means comprise neutral density filters.

6. The optical assembly according to claim 5, wherein said neutral density filters of different densities are arranged in a color filter wheel.

7. The optical assembly according to claim 6 further comprising a control unit for controlling a position of a neutral density filter of the color filter wheel.

8. The optical assembly according to claim 4, wherein the intensity reduction means comprise a neutral density filter with at least one of a rectangular continuous optical density coating providing linear, adjustable attenuation within the coated region via translation, a rectangular reduction in step optical density coating providing adjustable attenuation in steps within the coated region via translation, a round continuous optical density coating providing linear, adjustable attenuation within the coated region via rotation, or a round reduction in step optical density coating providing linear attenuation in steps within the coated region via rotation of the filter.

9. The optical assembly according to claim 2, wherein the notch filter and the static waveband reduction filter are combined into a combined static filter.

10. The optical assembly according to claim 9, wherein a first side of the combined static filter is coated with a narrow band notch filter and a second side of the filter is coated with the static waveband reduction filter.

11. The optical assembly according to claim 1, wherein the static waveband reduction filter is configured to reduce the intensity of light in the wavelength range 510-570 nm.

12. The optical assembly according to claim 2, wherein the notch filter reduces light intensity of wavelengths in the waveband 570-600 nm.

13. The optical assembly according to claim 12, wherein the notch filter reduces light intensity in the range 10-15%.

14. The optical assembly according to claim 1, further comprising beam homogenization optics.

15. A light projection system for generating an image with three primary colors, each primary color being respectively defined by a first, second and third waveband, said light projection system comprising:
- a blue laser source emitting a first blue laser beam of a fourth waveband, said blue laser source having a first laser driver,
- a second blue laser beam having a central wavelength and a fifth waveband,
- a substrate comprising a wavelength conversion element for emitting light at a plurality of wavelengths after absorption of a light beam at an excitation wavelength within the fifth waveband of the second blue laser beam, said substrate being positioned in an optical path of said second blue laser beam such that light transmitted through or reflected from the wavelength conversion element results in emission of a converted beam having a light spectrum comprising at least the second and third wavebands,
- a beam combiner for combining the first blue laser beam and the converted beam, which combination results in a white beam, comprising at least the first, second and third wavebands and providing the white beam to an imaging module, the light projection system further comprising:
- a static waveband reduction filter provided in the optical path of the white beam, the static waveband reduction filter filtering at least in the second waveband of the white beam to set a white point of the light projection system.

16. The light projection system according to claim 15, wherein the second blue laser beam is provided by splitting said first blue beam into said first and second blue laser beams and the first and second blue laser beams are provided by means of at least one of a beam splitter, polarization diversity, wavelength diversity, spatial or angular diversity applied to said first blue laser beam.

17. The light projection system according to claim 15, wherein the laser source comprises an array of individual lasers, the intensity of each individual laser being controlled by its laser driver.

18. The light projection system according to claim 17, wherein each laser can be pulsed by the corresponding laser driver.

19. The light projection system according to claim 15, wherein the notch filter reduces light within a notch wavelength range by 70% or up to 80, or 85%.

20. A method for generating an image with a light projection system, the image having three primary colors, each primary color being respectively defined by a first, second and third waveband, the method comprising:
- emitting a first blue laser beam of a fourth waveband, said blue laser source having a first laser driver,
- emitting a second blue laser beam having a central wavelength and a fifth waveband,
- emitting light at a plurality of wavelengths a substrate comprising a wavelength conversion element for absorption of a light beam at an excitation wavelength within the fifth waveband of the second blue laser beam, said substrate being positioned in an optical path of said second blue laser beam such that light transmitted through or reflected from the wavelength conversion element results in emission of a converted beam having a waveband comprising at least the second and third wavebands, combining the first blue laser beam and the converted beam, which combination results in a white beam, comprising at least the first, second and third wavebands and providing to an imaging module, the method further comprising:

filtering in the second waveband of the white beam using a static waveband reduction filter provided in the optical path of the white beam, the static waveband reduction filter filtering incident light to set a white point of the light projection system.

* * * * *